(12) United States Patent
Eide et al.

(10) Patent No.: US 6,637,479 B1
(45) Date of Patent: Oct. 28, 2003

(54) SYSTEM FOR OFFSHORE TRANSFER OF LIQUEFIELD NATURAL GAS

(75) Inventors: Jorgen Eide, Fana (NO); Glenn Pedersen, Bergen (NO); Kare Breivik, Tau (NO); Arild K. Samuelsen, Tananger (NO)

(73) Assignee: Statoil ASA, Stavenger (NO)

( * ) Notice: Subject to any disclaimer, the term of this patent is extended or adjusted under 35 U.S.C. 154(b) by 0 days.

(21) Appl. No.: 10/111,262

(22) PCT Filed: Oct. 26, 2000

(86) PCT No.: PCT/NO00/00356

§ 371 (c)(1),
(2), (4) Date: Aug. 30, 2002

(87) PCT Pub. No.: WO01/34460

PCT Pub. Date: May 17, 2001

(30) Foreign Application Priority Data

Oct. 27, 1999 (NO) .......................................... 1999 5250

(51) Int. Cl.[7] .................................................. B65B 1/04
(52) U.S. Cl. .................... 141/387; 141/284; 114/230.1; 114/258
(58) Field of Search ................................. 141/387, 388, 141/389, 86–88, 279, 284; 114/230.1, 231, 264, 230.15–230.27, 258–263, 196; 137/615

(56) References Cited

U.S. PATENT DOCUMENTS

| 3,199,553 A | | 8/1965 | Garrett et al. | |
| 4,135,543 A | | 1/1979 | DeGraaf | |
| 4,393,906 A | * | 7/1983 | Gill | ............................. 141/387 |
| 4,867,211 A | | 9/1989 | Dodge et al. | |
| 4,989,903 A | | 2/1991 | McAllister | |
| 6,367,522 B1 | * | 4/2002 | Tyer | ............................ 141/387 |

FOREIGN PATENT DOCUMENTS

| NL | 9400784 | 8/1995 |
| WO | 93/13976 | 7/1993 |
| WO | 99/35031 | 7/1999 |
| WO | 99/38762 | 8/1999 |

OTHER PUBLICATIONS

International Search Report—PCT/NO00/00356, Swedish Patent Office, Apr. 03, 2001.

* cited by examiner

Primary Examiner—Steven O. Douglas
(74) Attorney, Agent, or Firm—Harness, Dickey & Pierce, P.L.C.

(57) ABSTRACT

A system for transfer of liquefied natural gas (LNG) between two vessels (1, 2). The system comprises a coupling head (7) mounted at one end of a flexible pipe means (4) and arranged for attachment on a platform (19) at one end of one vessel (1) when it is not in use, and a connection unit (8) mounted at one end of the other vessel (2) and comprising a pull-in funnel (50) shaped for guided pull-in of the coupling head (7) to a locking position in which the pipe means (4) can be connected to transfer pipes (56) on the other vessel (2) via a valve means (31) arranged in the coupling head. The coupling head (7) is provided with a guide means (40) and is connected to at least one pull-in wire (42) for guided pull-in of the coupling head (7) into the connection unit (8) by a winch means (66) an the other vessel (2).

18 Claims, 13 Drawing Sheets

SYSTEM FOR OFFSHORE TRANSFER OF LIQUEFIELD NATURAL GAS

The invention relates to a system for offshore cryogenic loading, especially for transfer of liquefied natural gas between two vessels.

Offshore production and loading of liquefied natural gas (LNG) for many years has been evaluated by several oil companies without developing to a reality. The most important obstacles for this are that oil and gas fields hitherto have been developed in an economic manner by means of pipelines from the gas field to the LNG plant, and transport by means of LNG shuttle tankers to the market, and that the technology for offshore production and loading has not been considered to be mature for such operations.

As the search for oil and gas is extended to more remote regions and deeper waters, new techniques and less costly solutions for oil and gas production are required. As a result, the technology for offshore LNG production and equipment for offshore LNG transfer are in the process of being developed, and several concepts have append If the remaining technology gap can be closed and an economic incentive is sufficiently big, one or more of these techniques may be put into use in the near figure.

Thus, the object of the invention is to provide a system for LNG transfer between two floating vessels, wherein the system is constructed for safe remote operation, and for stable and safe transfer with a high capacity.

For achieving the above-mentioned object there is provided such a system which, according to the invention is characterised in that it comprises a coupling head mounted at one end of a flexible pipe means and arranged for attachment on a platform at one end of one vessel when it is not in use, and a connection unit mounted at one end of the other vessel and comprising a pull-in funnel shaped for guided pull-in of the coupling head to a locking position in which the pipe means can be connected to transfer pipes on the vessel via a valve means arranged in the coupling head, the coupling head further being provided with a guide means and being connected to least one pull-in wire for guided pull-in of the coupling head into the connection unit by a winch means on the other vessel.

In an advantageous embodiment of the system the flexible pipe means consists of at least two parallel extending flexible pipes which are coupled to a respective valve in the valve means of the coupling head. Each valve preferably is bipartite to allow an emergency disconnection of the pipe means, and there is then also provided a cutter means for cutting of each pull-in wire in an emergency disconnection.

The invention will be further described below in connection with exemplary embodiments which are schematically shown in the drawings, wherein FIG. 1 shows a side view of two partly illustrated vessels which are connected by means of a first embodiment of a system according to the invention;

Figure 13:
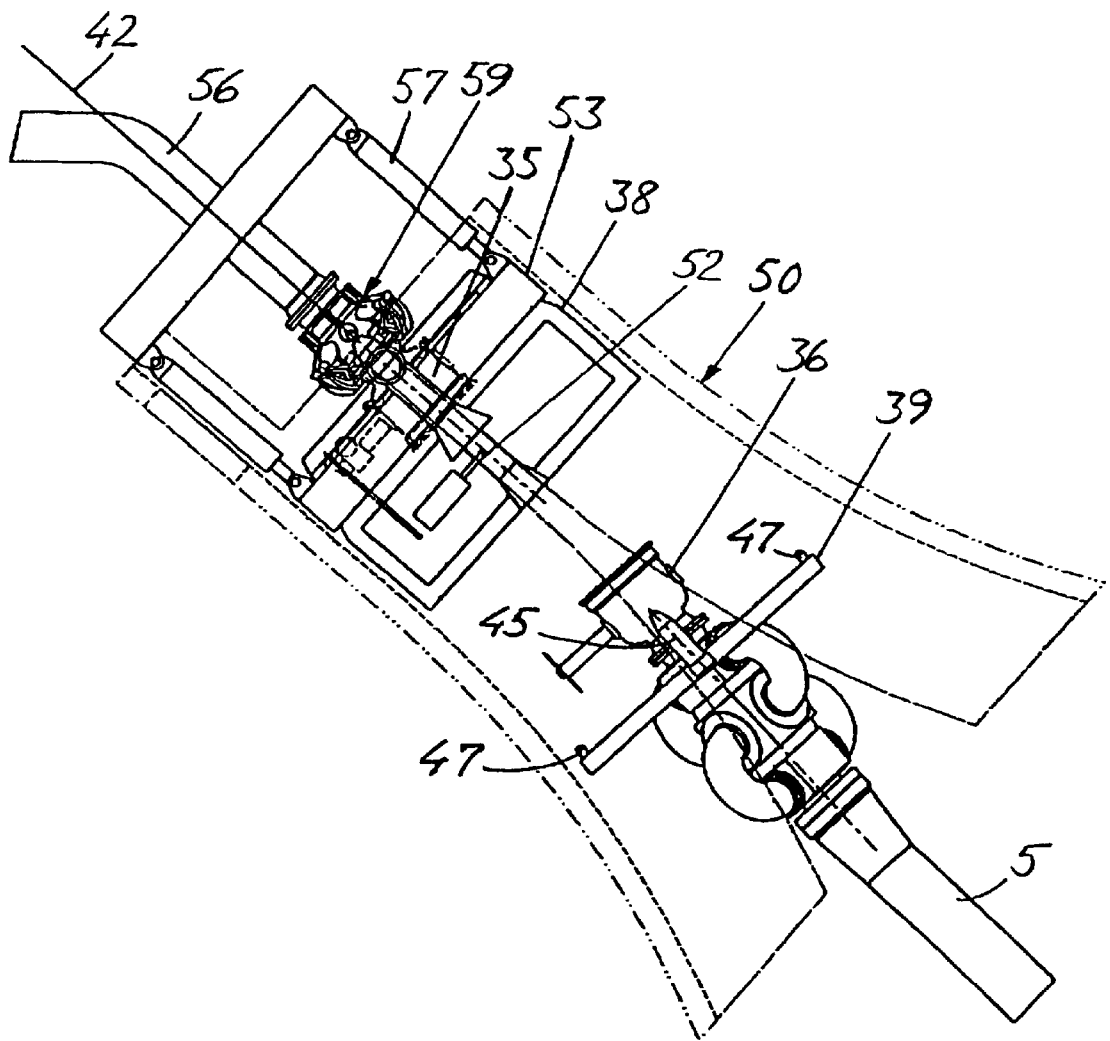
Figure 14:
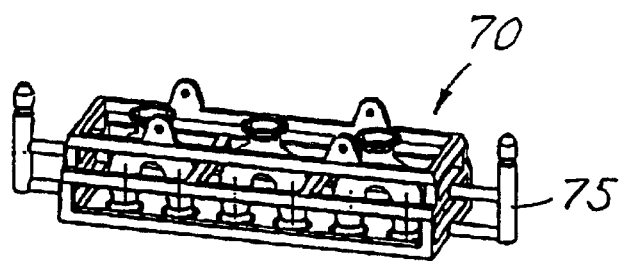
Figure 15:
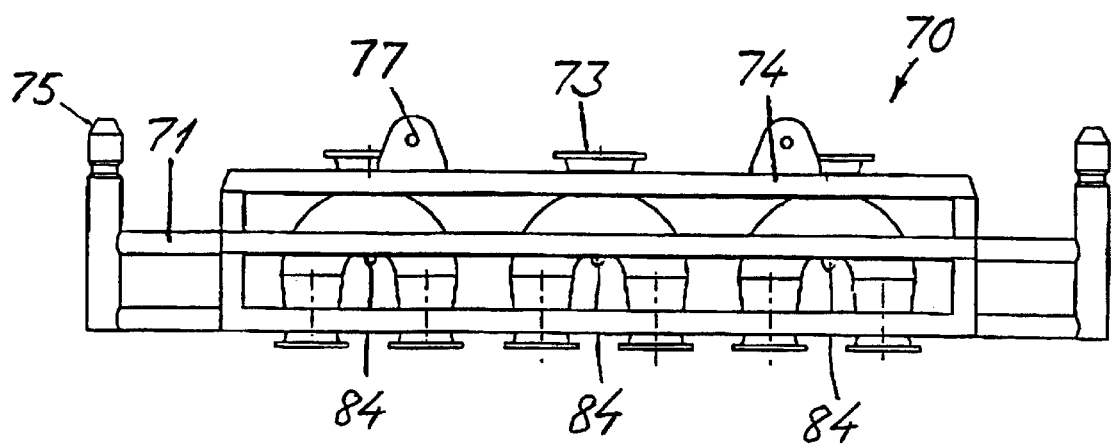
Figure 16:
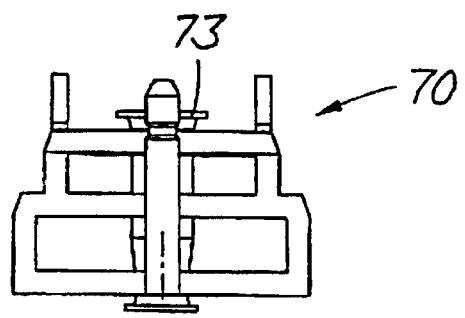
Figure 17:
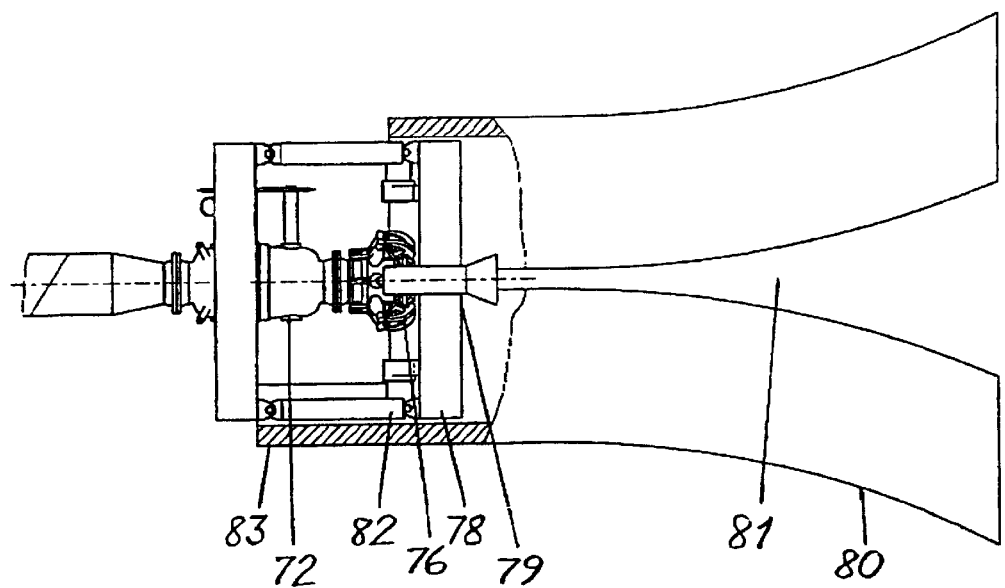
Figure 18:
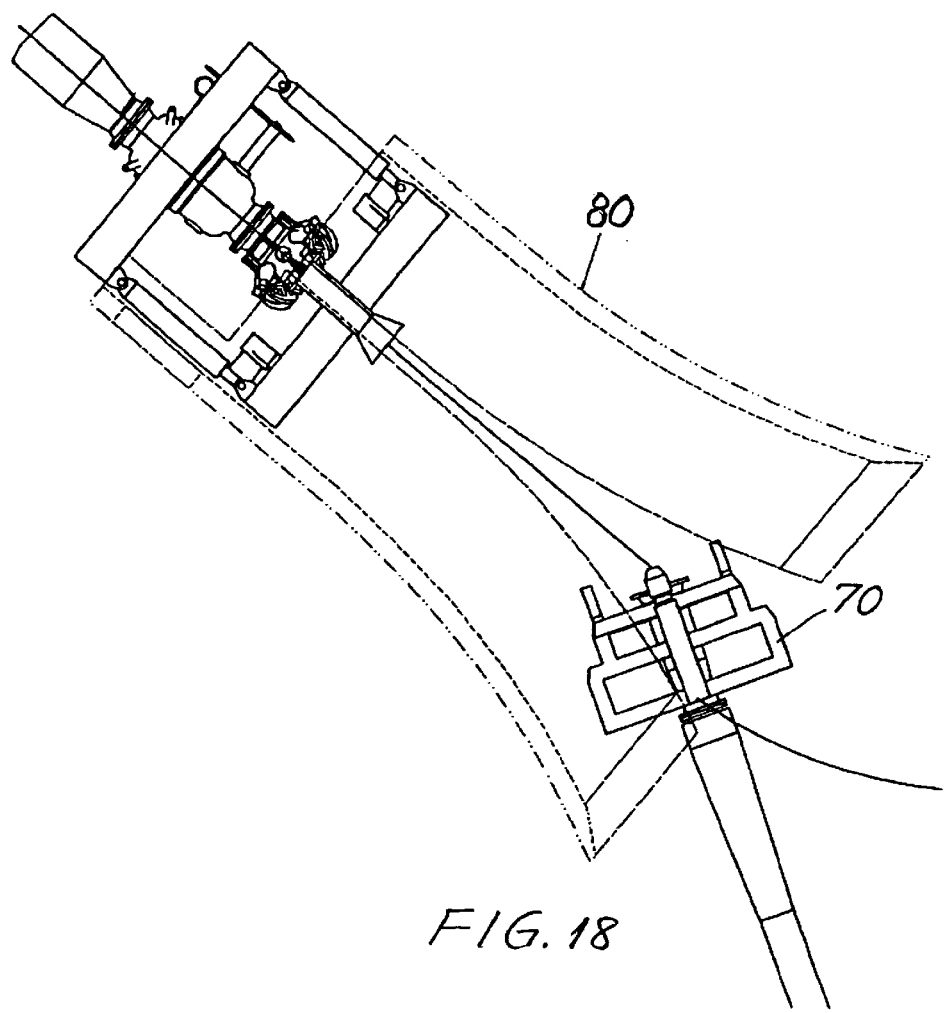
Figure 19:
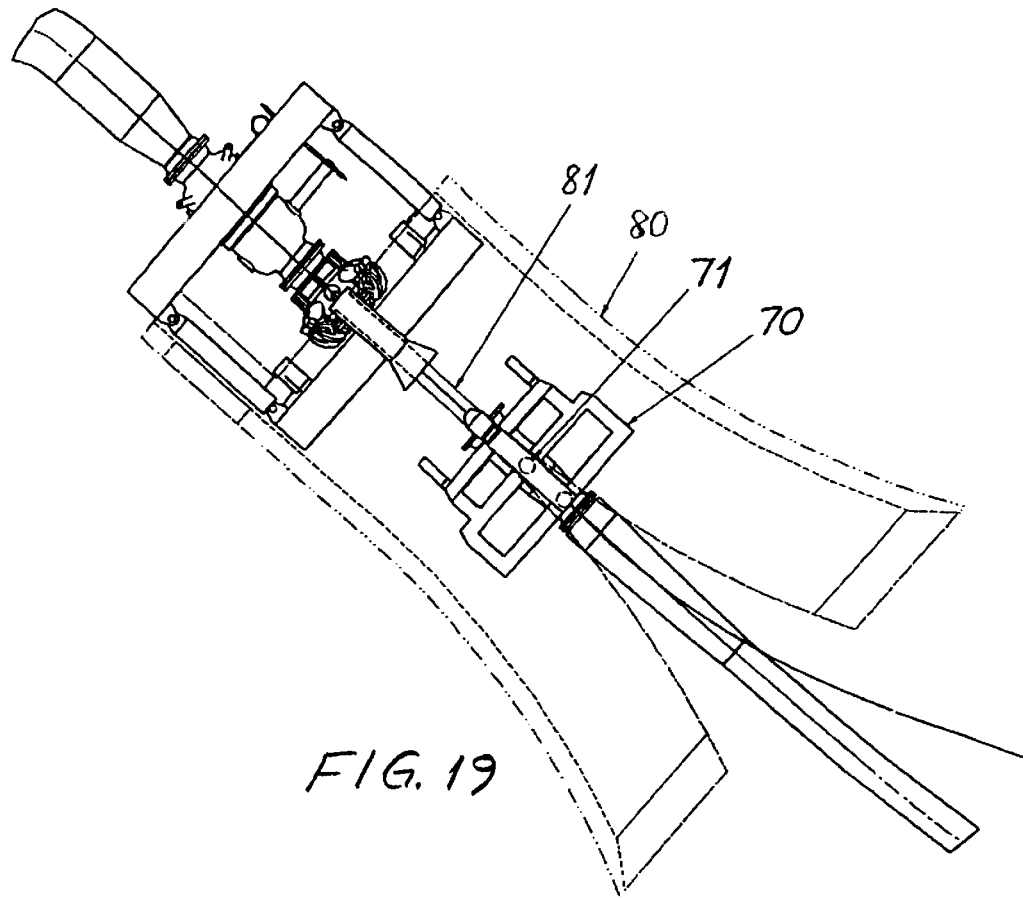
Figure 20:
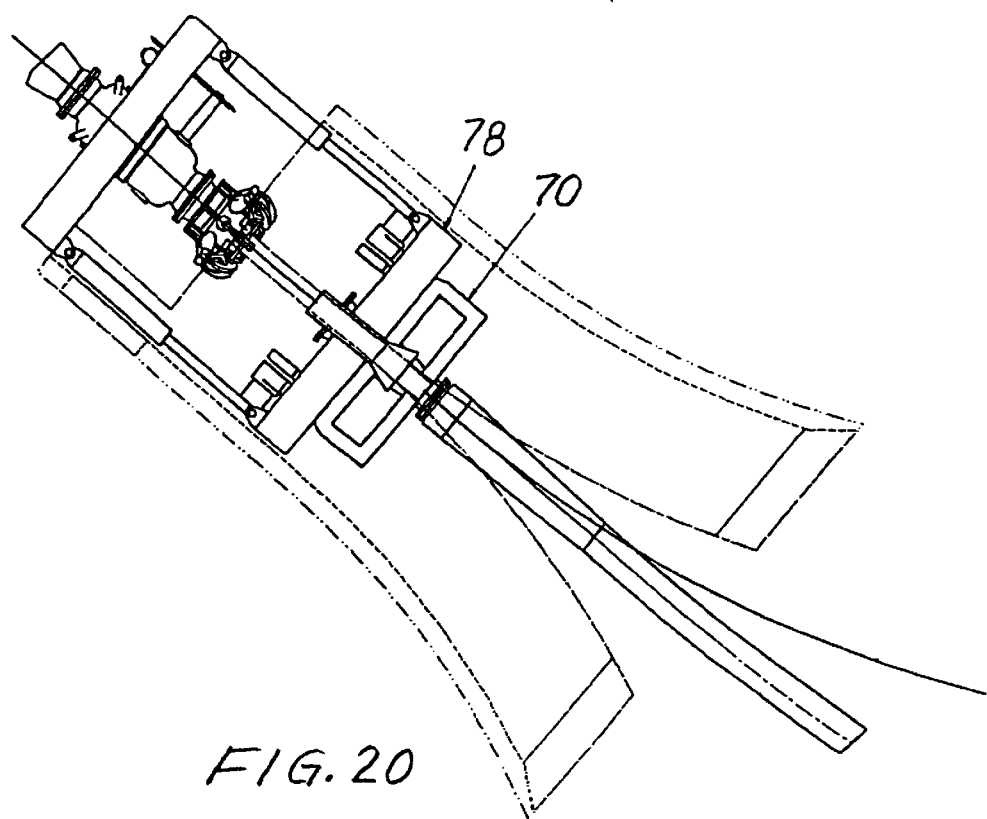
Figure 21:
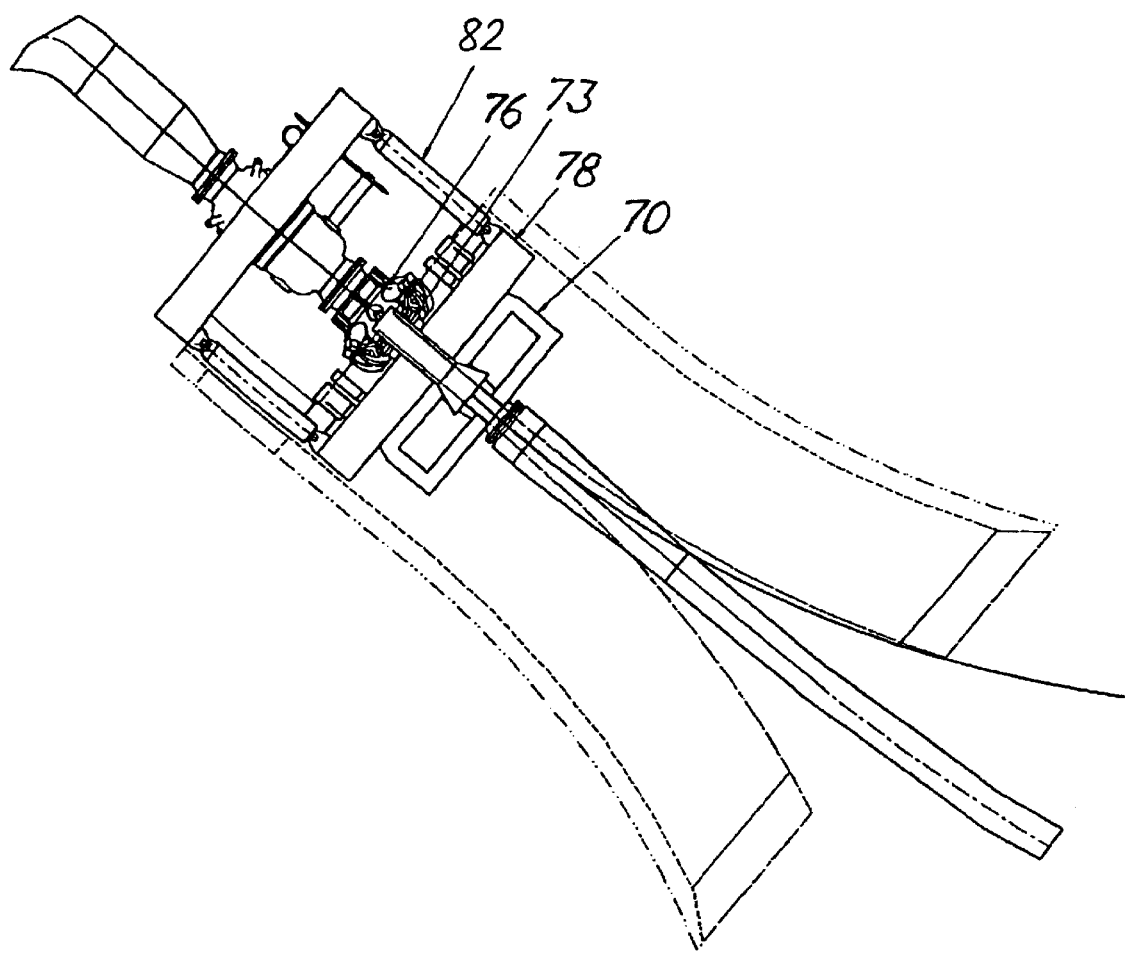
Figure 22:
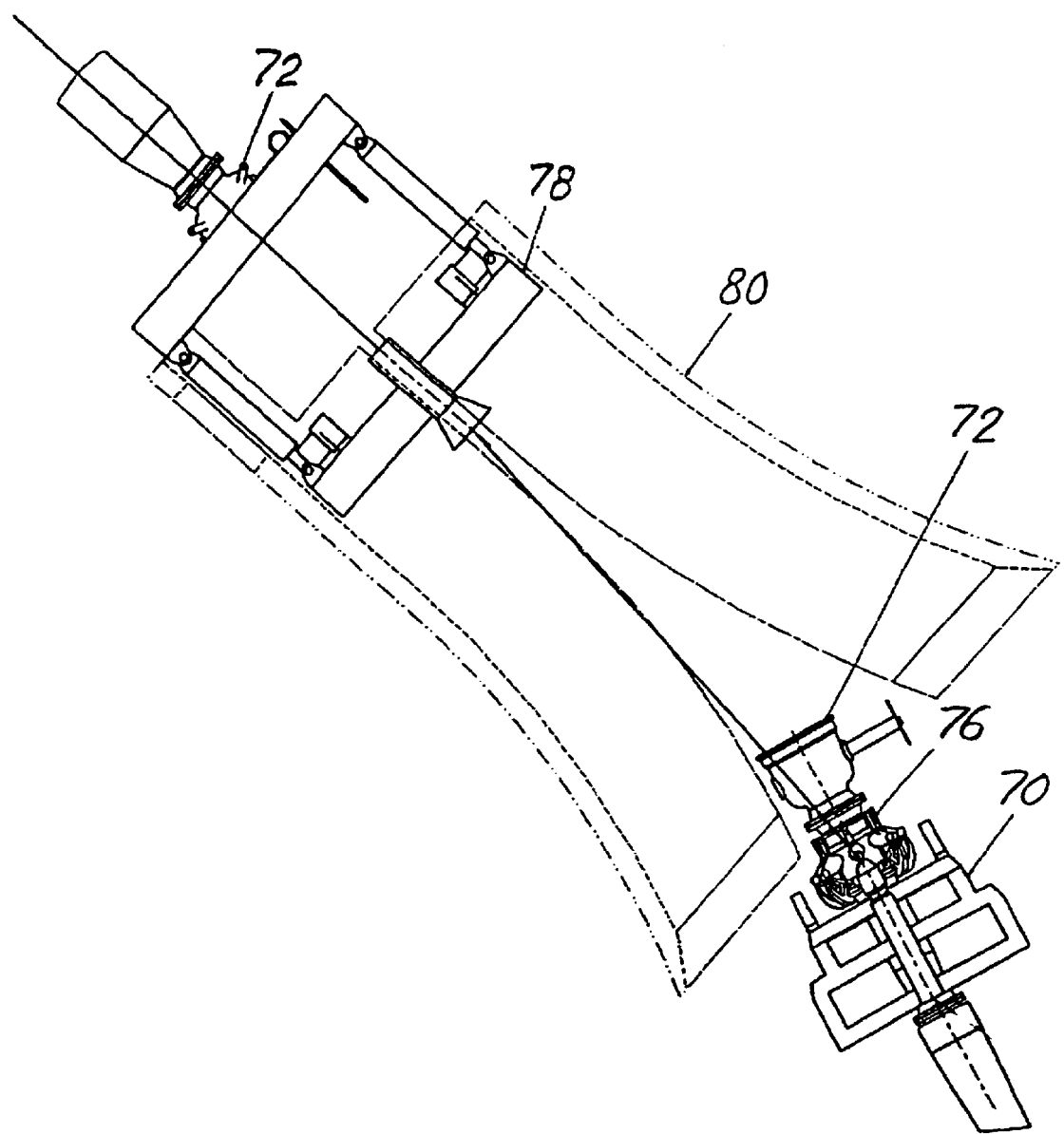

FIGS. 9–12 show different side views of the connection unit and the coupling head, where in the pull-in funnel is shown in its inclined position of use and the coupling head is shown in different positions during pull-in and locking of the coupling head in relation to the pull-in funnel; and FIG. 13 shows a side view of the connection unit with the pull-in wire and the bipartite coupling head in an emergency disconnection situation;

FIG. 14 shows a perspective view of a second embodiment of a coupling or pulling head forming part of a second embodiment of the system according to the invention;

FIG. 15 shows an enlarged side view of the pull-in head of FIG. 14;

FIG. 16 shows a side view at right angles to the side view of FIG. 15;

FIG. 17 shows a side view of a second embodiment of the connection unit forming part of the second embodiment of the system, shown partly sectioned;

FIGS. 18–21 show different side views of the connection unit and the pull-in head according to the second embodiment, in different phases during pull-in and locking of the pull-in head in the connection unit; and FIG. 22 shows a side view of the connection unit with the pull-in funnel and the pull-in head in an emergency disconnection situation.

Figure 1:
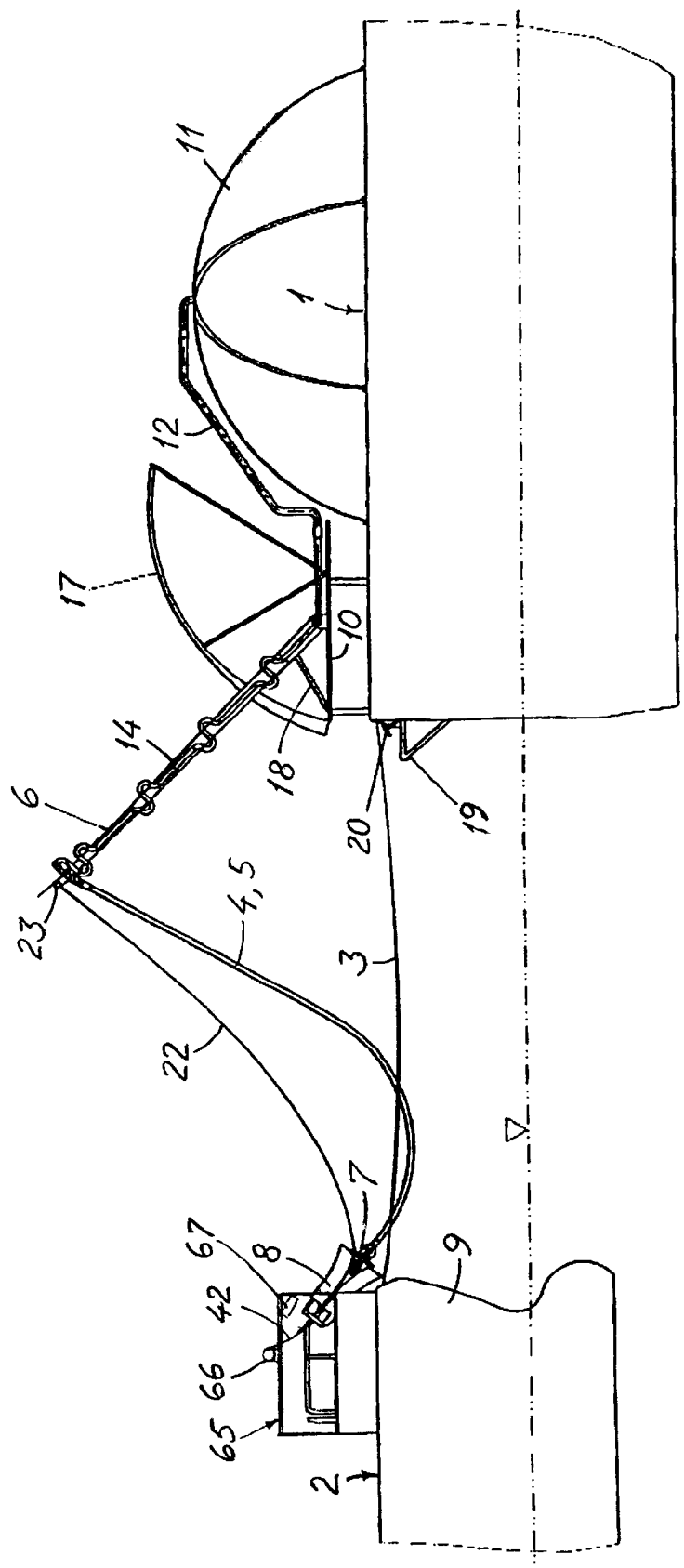

In the schematic side view of FIG. 1 there is partly shown two vessels on which there is arranged a system according to the invention for the transfer of LNG from one vessel to the other. The one or first vessel 1 is a production vessel which is constructed to operate as an LNG production storage and off loading vessel. The ship is of the STP type (STP=Submerged Turret Production) and has its own processing plant for processing LNG and LPG (Liquefied Petroleum Gas). The other vessel 2 is a shuttle tanker in the form of a conventional LNG vessel which is built for loading in the open sea. The vessel has a built-in connecting and loading system in the bow, whereas loading in harbour takes place from a conventional unloading system at the center of the vessel.

The shuttle tanker 2 in FIG. 1 is moored to the production vessel 1 by means of a pair of hawsers 3 in a "crowfoot". The vessels have a mutual distance of 55–65 meters, and the position is maintained in that the shuttle tanker keeps a constant astern pushing force.

The system is constructed and dimensioned for the transfer of 10,000 m³ LNG per hour via a flexible pipe means 4 mounted on the quarter-deck of the production ship. In the present embodiment, the pipe means 4 comprises three parallelly extending, flexible pipes 5 (only one is shown in the drawings) having an internal diameter of 16". The pipes extend between the free end of a pivotally mounted boom means 6 on the quarter-deck of the vessel 1 and a coupling head 7 which, in FIG. 1, is shown to be introduced into the pull-in and connection unit 8 of the system. This is located on the bow 9 of the shuttle tanker 2, about 6 m above the deck level. Two of the flexible pipes 5 transfer LNG, whereas the third pipe returns vaporised LNG to the production ship 1. The parallell extension of the pipes is maintained in that the pipes at regular intervals are interconnected by means of flexible spacers (not shown). As will be understood, the number of pipes will be dependent on the transfer capacity of the system.

In addition to the necessary closing/opening valves on the shuttle tanker and the production ship, it will be necessary to have transverse connection valves between the flexible pipes. Before starting the transfer of LNG, it will be necessary to cool the two delivery pipes with nitrogen, whereas nitrogen will be used at the end of the transfer, to blow LNG out from the pipes before disconnection is effected. The transverse connection valves will be a permanent part of the pipe system on the shuttle tanker, whereas the pipe for supply of nitrogen will be the same as the pipe used during the transfer for return of gas. Gas supply and gas return thereafter will take place on board the shuttle tanker.

As mentioned, one end of the flexible pipe means 4 is connected to the free end of a pivotable boom means. In the illustrated embodiment the boom means consists of a so-called A-frame 6 which, at its lower end, is pivotally mounted on a platform 10 on the quarter-deck of the production ship 1. From the spherical tanks 11 of the ship there are arranged pipes 12 which are connected through respective swivels 13 to pipe stretches 14 supported by respective ones of the two legs 15 of the A-frame. The pipe stretches 14 are coupled to three flexible couplings 16 (FIG. 4) at the top of the A-frame 6. The other ends of the couplings 16 are connected to the flexible pipes 5.

Figure 3:
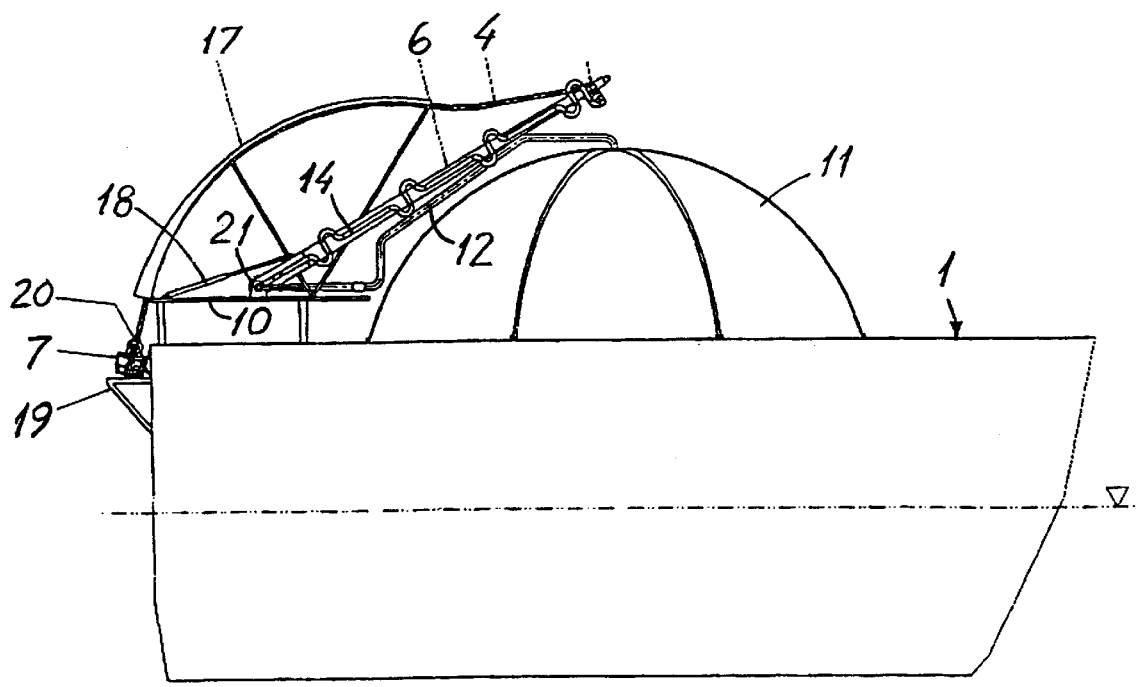
FIG. 3 shows a side view of the same part of the system as in FIG. 1, but shows constituent elements in a position wherein the coupling head is not in use.

When the system is not in use, the A-frame 6 will be in a first position wherein it points forwards towards the bow of the vessel, as shown in FIG. 3. In this position the pipe means 4 is supported by a supporting means on the vessel, more specifically by a ramp 17 mounted in the opening between the legs 15 of the A-frame. As shown, the ramp 17 has a convexly curved, possibly circle-sector-shaped surface which supports a substantial pail of the pipe means.

During the transfer of the coupling head 7 and the flexible pipes 15 to the second vessel 2, the A-frame 6 will, by means of hydraulic cylinders 18, be pivoted aft so that it projects outwards from the vessel 1, the frame finally forming an angle of ca. 45° with the deck of the vessel as shown in FIG. 1.

When the system is not in use, the coupling head 7 will be parked on a platform 19 on the stern of the production ship, as shown in FIG. 3. The platform suitably may be U-shaped, with space for the coupling head in the opening. In the parked mode the coupling head is retained on the platform 19 by a locking means which is shown to comprise suitable, hydraulically actuated locking arms 20.

Figure 2:
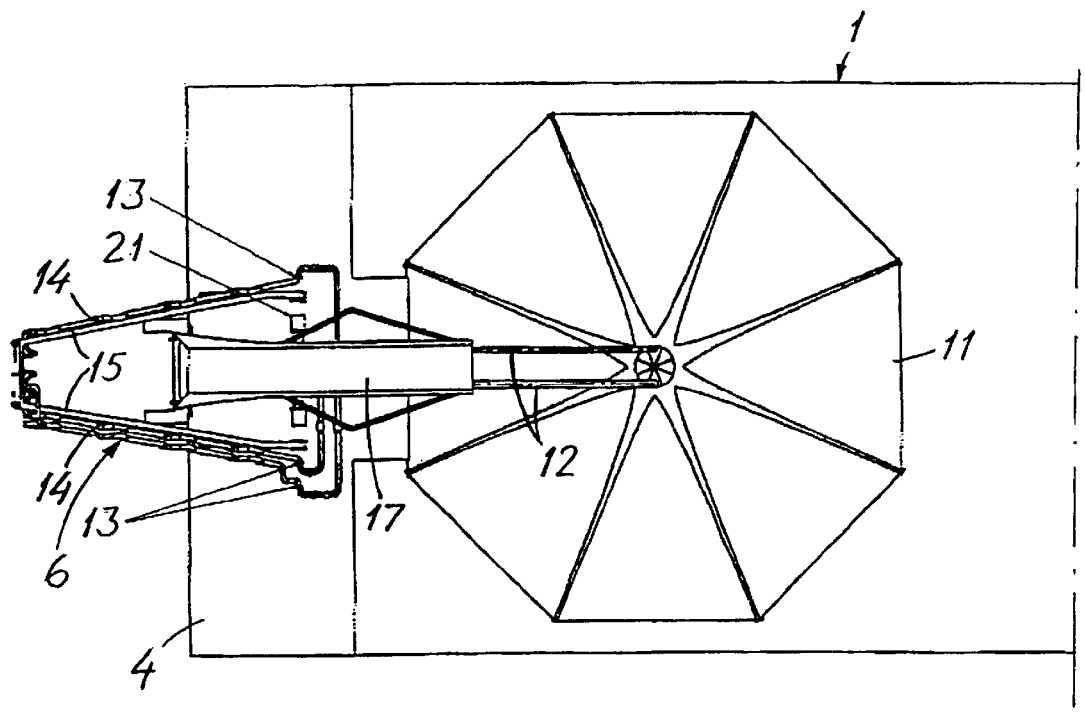
FIG. 2 shows a plan view of that part of the system which is mounted on the vessel at the right in FIG. 1.
Figure 4:
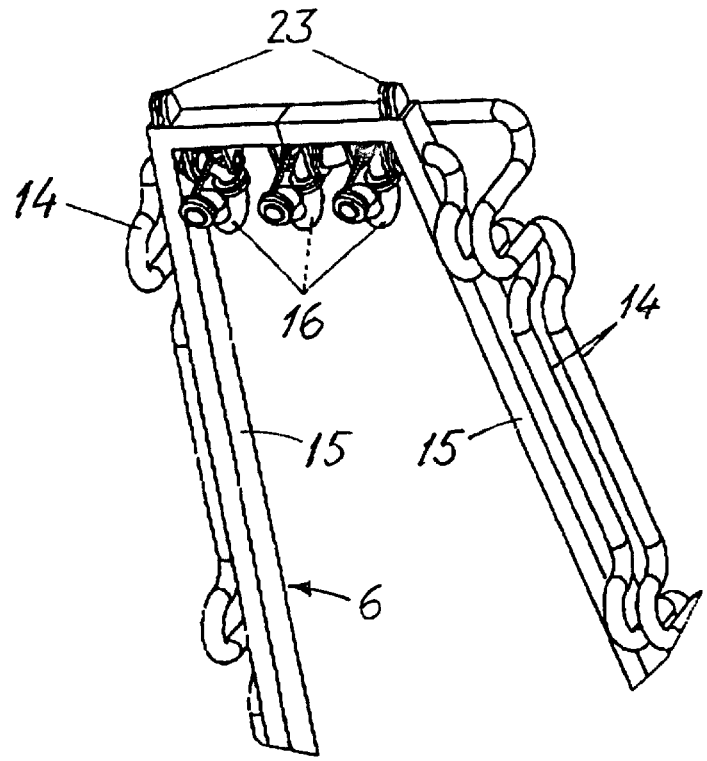
FIG. 4 shows a perspective partial view of the upper part of an A-frame shown in the plan view of FIG. 2.

As mentioned above, the coupling head 7 is connected to at least one pull-in wire for guided pull-in of the coupling head into the connection unit 8 by a winch means on the shuttle tanker 2. The illustrated embodiment of the coupling head comprises two such pull-in wires, as further described below. These pull-in wires are also connected to respective winch means 21 on the production ship 1. The winch means are of the constant tension type, so that those parts of the wires which are situated between the coupling head and the winch means, function as restraining or tension wires, for controlling the position of the coupling head during the pull-in thereof into the connection unit, as further described at the end of the description. In FIGS. 2 and 3, these winch means 21 are shown to be arranged on the platform 10 in the opening between the legs of the A-frame 6. The wires 22 (FIG. 1) run over a pair of pulleys 23 mounted at the upper end of the A-frame, as shown in FIG. 4.

Figure 5:
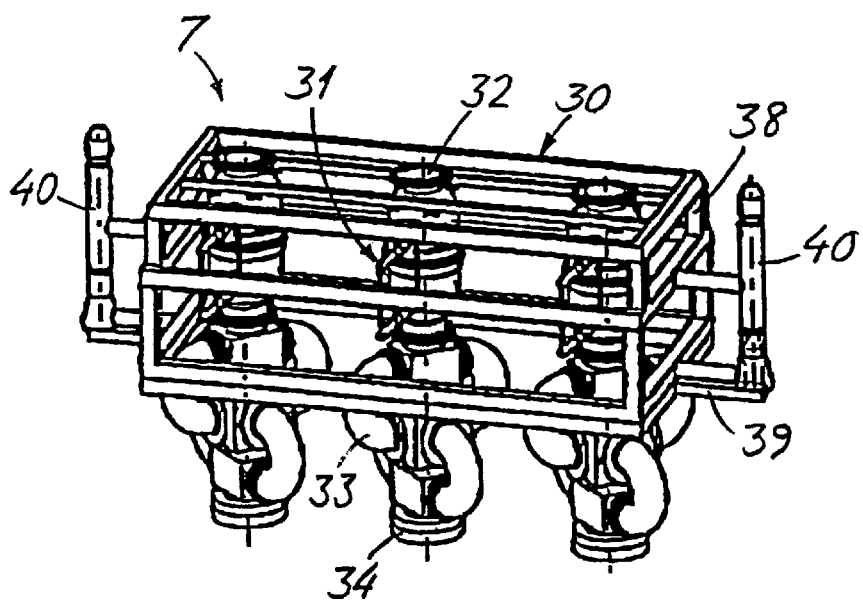
FIG. 5 shows a perspective view of a first embodiment of the coupling head of the system.
Figure 6:
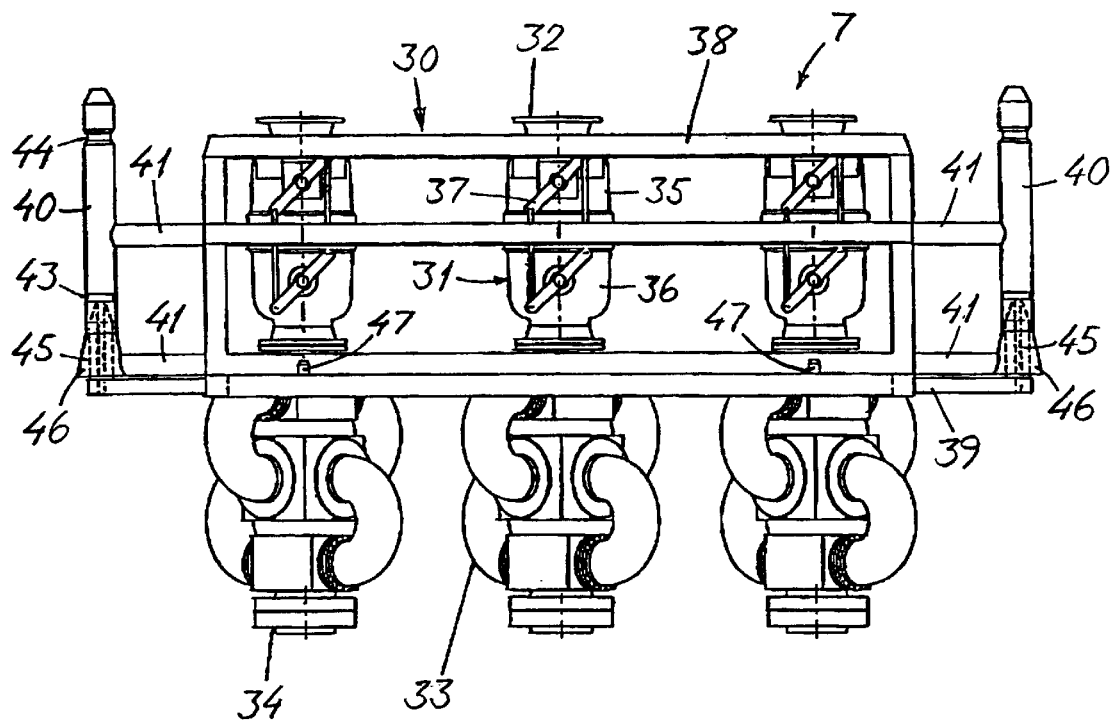
FIG. 6 shows an enlarged side view of the coupling head of FIG. 5.
Figure 7:
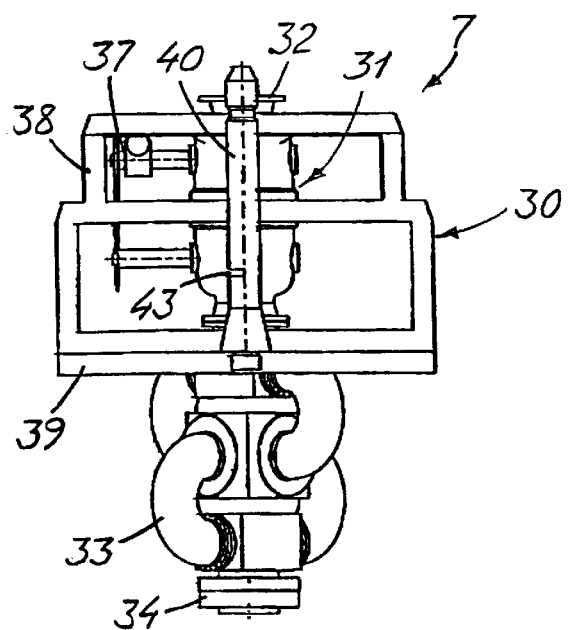
FIG. 7 shows a side view at right angles to the side view of FIG. 6.

An embodiment of the coupling head 7 is shown in FIGS. 5–7. As shown this comprises a frame means 30 in which, for each of the three flexible pipes 5, there is arranged a valve means 31 which is provided with a connecting flange 32 for connection to equipment in the connection unit 8, and with a flexible joint (cardan joint) 33 and a svivel 34 for connection to the flexible pipes 5 in question. The flexible joints and the swivels are to allow the movements and the rotation of the pipes which will normally occur during a pull-in operation and during LNG transfer. The flexible pipes suitably may be connected to the swivels through bending stiffeners 48 (see FIG. 9) which are to prevent the pipes from being overbent.

As mentioned, during transfer of LNG, the valve flanges 32 are connected to equipment in the connection unit 8. This equipment comprises hydraulically operated primary couplers which are constructed so that they can not open in case of failure in the hydraulic system. For this reason, and because of the fact that the primary couplers will be subjected to strong icing at the extremely low temperature (−163° C.) in the crygenic transfer, it is necessary to have an emergency disconnection system ensuring quick disconnection of the pipe means 4 in an emergency situation.

In order to allow such an emergency disconnection, each of the valve means 31 is bipartite, and suitably consists of two conventional, remotely controlled ball valves 35, 36 with an appurtenant locking mechanism 37. Further, also the frame means 30 is bipartite and consists of an upper framework 38 and a lower framework 39. The upper valves 35 of the valve means 31 with appurtenant connecting flanges 32 are fastened in the upper framework 38, so that the connecting flanges project somewhat above the upper side of the framework and are situated in the same plane. The lower valves 36 with appurtenant flexible joints 33 and swivels 34 are fastened in the lower framework 39.

In case of a possible emergency disconnection this will be controlled from the shuttle tanker 2 where the valves 35, 36 are firstly closed, and the locking and release mechanism 37 thereafter is activated. The pull-in wires (not shown in FIGS. 5–7) of the coupling head are cut by means of a cutter means (described later) provided for this purpose. The lower part of the coupling head 7, i.e. the lower framework 39 and the elements fastened thereto, thereafter will be dropped into the sea and subsequently be pulled on board the production ship, as further described later. This lower part is best shown in FIG. 13 which illustrates an emergency disconnection situation.

The upper framework 38 constitutes the outer frame of the coupling head 7, and consequently the part which has to stand up to collisions in pull-in into the connection unit 8. In order to protect the framework itself, this is therefore advantageously provided with protecting parts or wear edges (not shown) of wood or another suitable material at exposed places. As appears from FIG. 7, the framework 38 has a stepped upper part which will guide itself into a connecting frame situated at the upper end of the pull-in funnel of the connection unit 8.

A pair of guide posts 40 are fastened to the framework 38 by means of holding brackets in the form of short arms 41 projecting on opposite sides of the framework. The alms 41 function as an extra guide in pull-in of the coupling head, the arms then being guided in longitudinal guide slots provided in the pull-in funnel, as mentioned below. The guide posts are adapted for introduction into respective guide funnels in the connection unit (see FIGS. 8 and 9).

The guide posts 40 are hollow with a through passage for a respective pull-in wire 42, and is provided with means for locking of the wire in relation to the guide post. These means for examples may consist of suitable wedges (not shown) which can be driven into the longitudinal passage so that the wire is locked. The guide posts are also provided with a slot 43 for introduction of a cutter for cutting the wire in question in an emergency disconnection. Further, each of the guide posts is provided with a groove 44 for engagement with a locking member forming part of a hydraulically operated locking means, for locking of the coupling head to the aforementioned coupling frame in the connection unit, as further described below.

The lower framework 39 essentially consist of a rectangular frame member which is provided at its opposite ends with a pair of mini-posts 45 adapted for engagement in a funnel 46 at the lower end at the guide posts 40, and further with four guide pins 47 holding the upper and lower frameworks in the correct position relative to each other when they are interconnected. The framework is not equipped with any locking arrangements, the units thereof becoming locked in the emergency disconnection lock.

Figure 8:
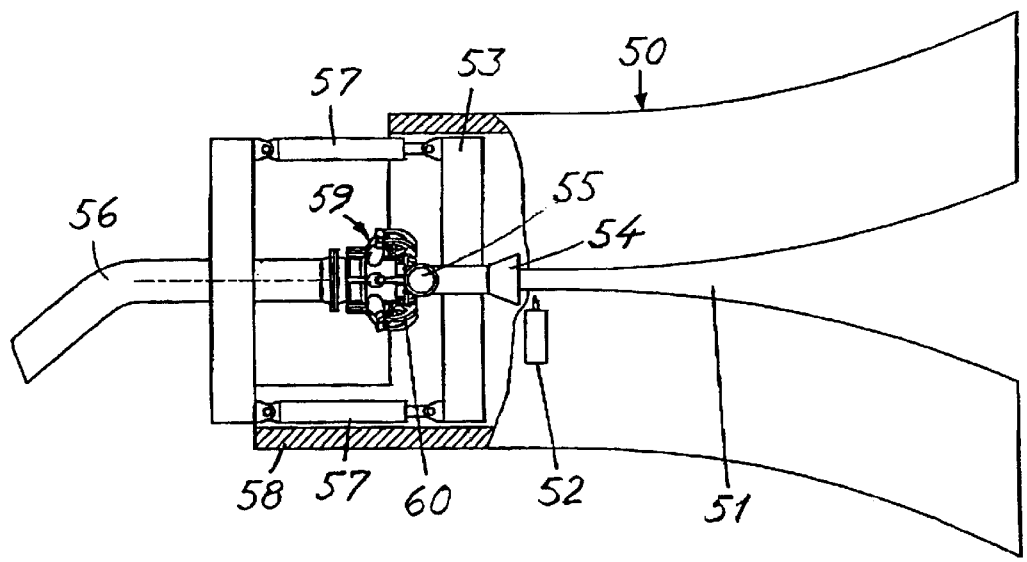
FIG. 8 shows a side view of a first embodiment of the connection unit forming part of the first embodiment of the system, shown partly sectioned.
Figure 9:
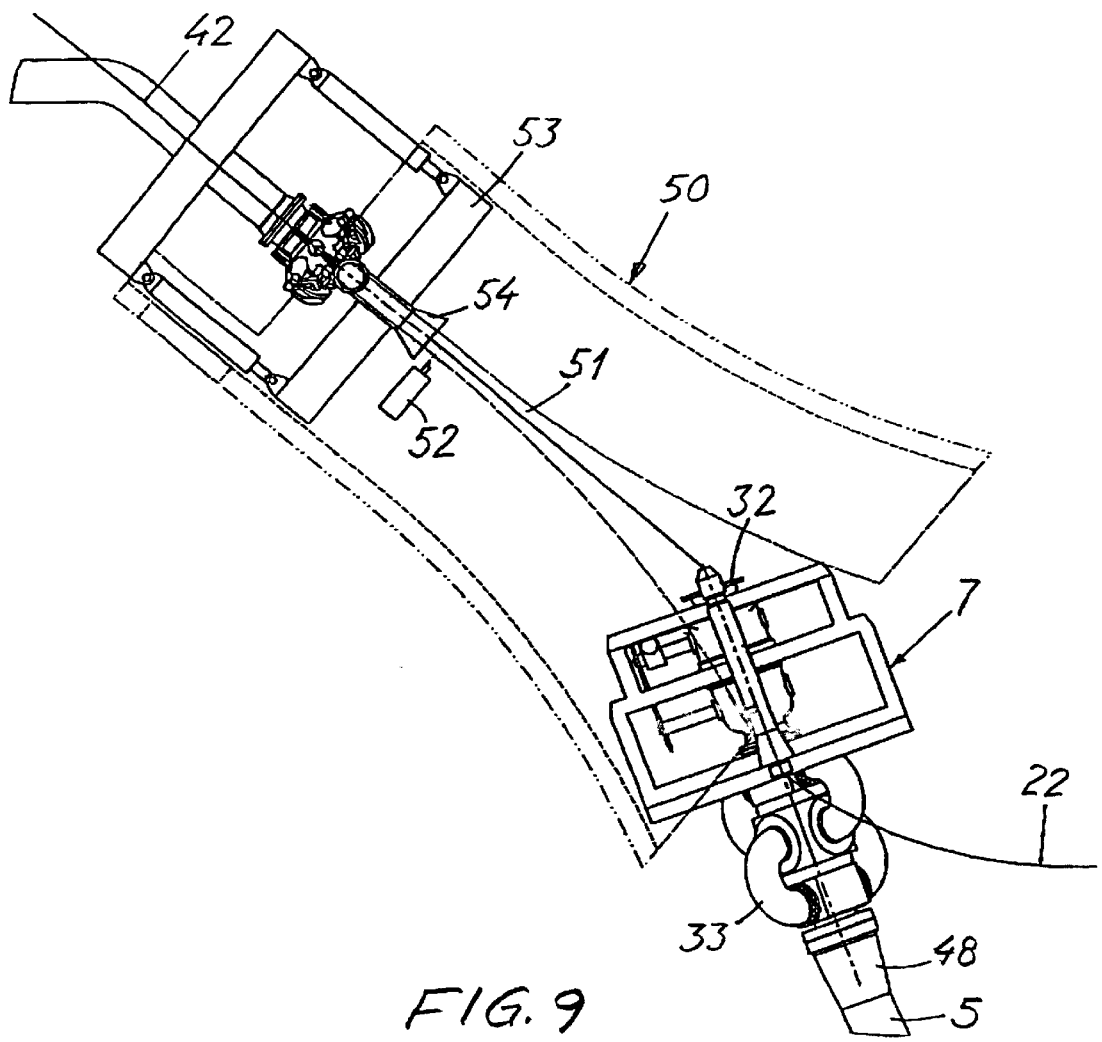
Figure 10:
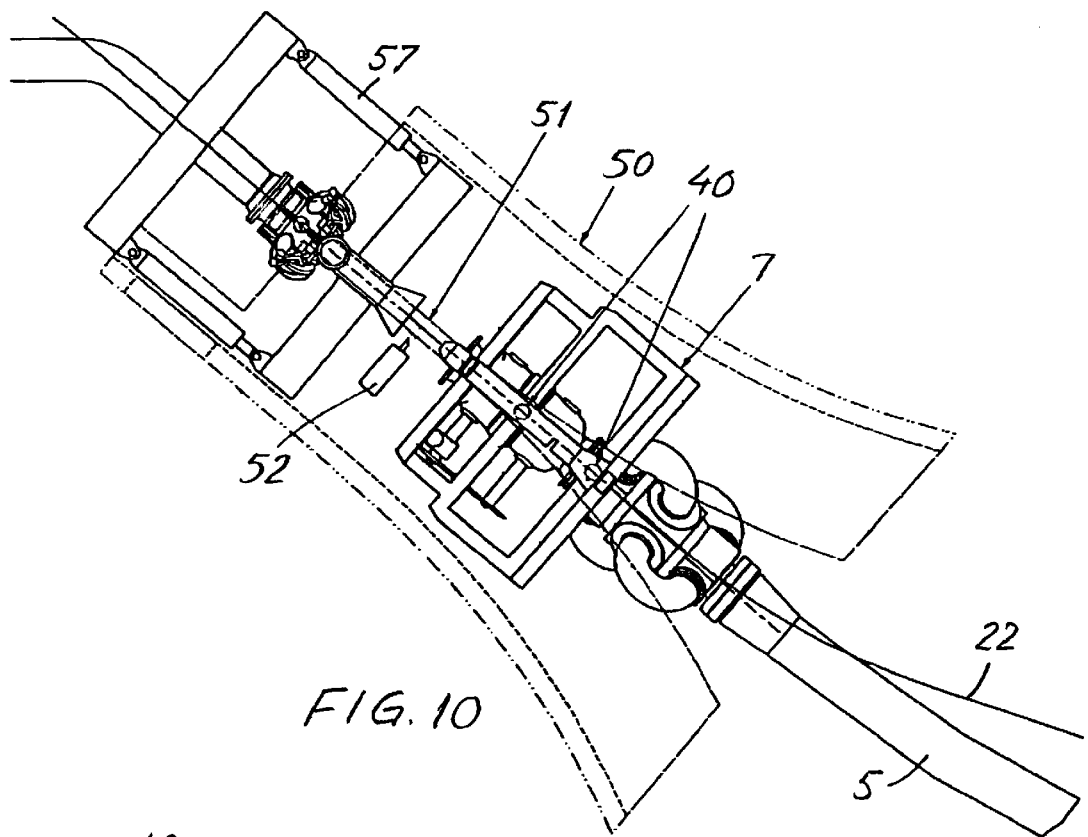
Figure 11:
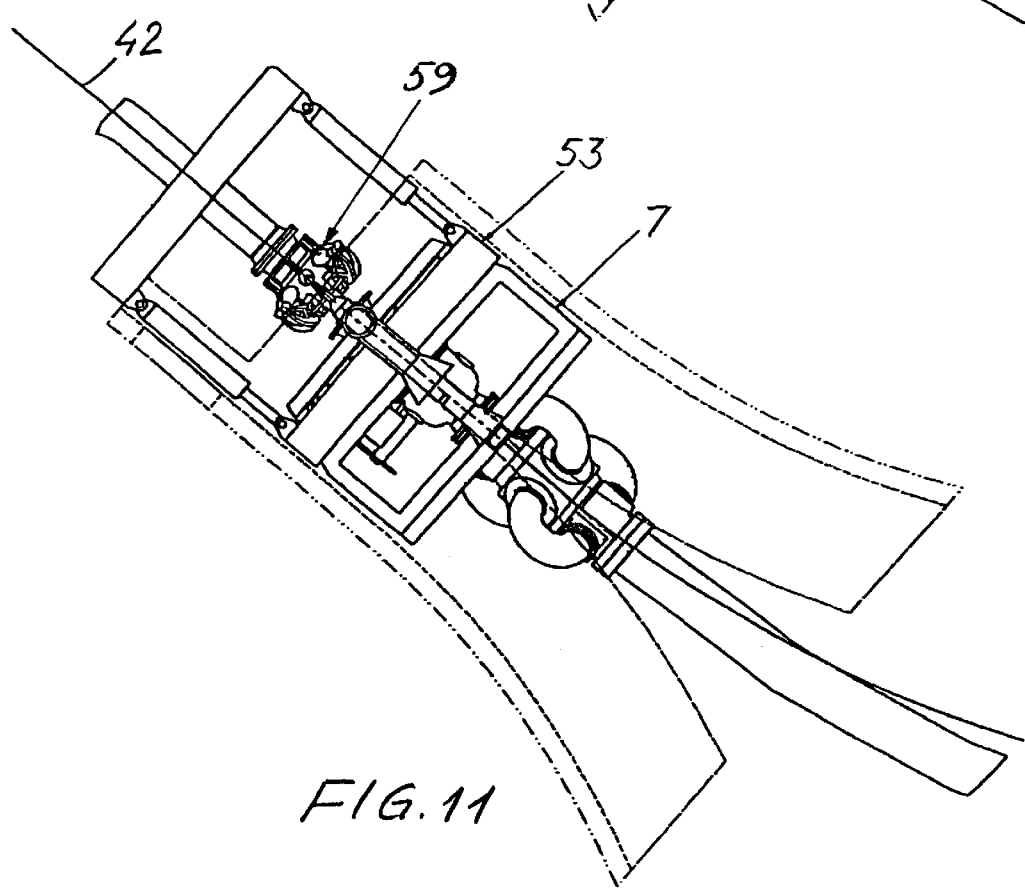
Figure 12:
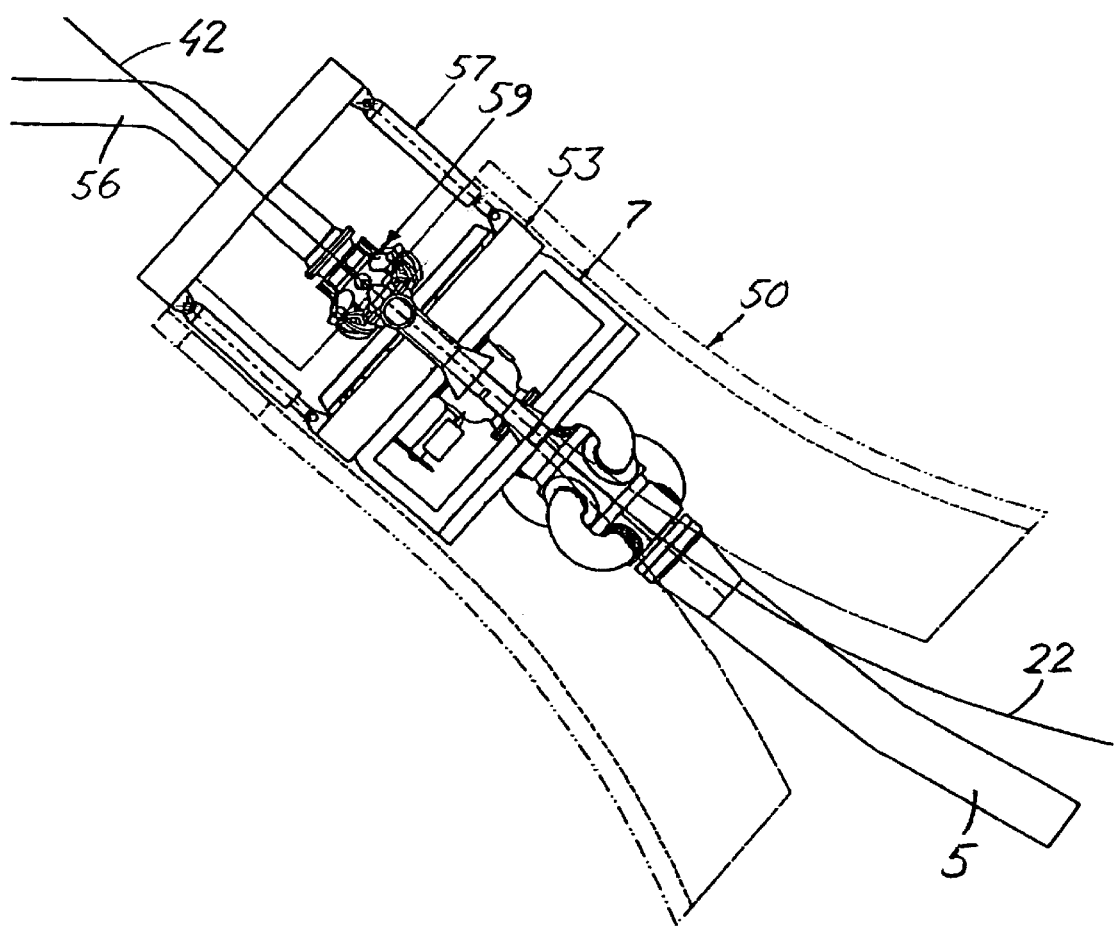

An embodiment of the connection unit 8 which is mounted on the shuttle tanker 2, is shown in a partly sectioned side view in FIG. 8. The unit comprises a main guide funnel or pull-in funnel 50 which is mounted in an inclined position on the bow 9 of the shuttle tanker 2 at an angle of ca. 40° with the ship deck, and with the introduction opening approximately at deck level. The funnel has an outwardly diverging, outer portion passing smoothly into a cylindrical inner portion, and thereby forms a primary guide means for the coupling head 7. Further, the funnel is provided with a secondary guide means in the form of two longitudinally extending guide slots 51 having a large width at the introduction opening and being inwards converging to a width corresponding to the holding arms 41 for the guide posts 40 of the coupling head, so that the holding arms will slide in the guide slots 51 whereas the guide posts will run at the outside of the funnel. The guide slots suitably may have replaceable liners of wood or another suitable material. Wire cutters 52 for cutting of the pull-in wires 42 in case of an emergency disconnection are mounted next to the guide slots 51.

At the upper end of the inner portion of the pull-in funnel 50 there is arranged a coupling time 53 which is arranged to receive the stepped upper part of the coupling head 7. On the coupling frame there are mounted two guide funnels 54 which are adapted to receive the guide posts 40 of the coupling head. At the top of each guide funnel 54 there is arranged a locking cylinder 55 for engagement in the locking groove 44 in the guide post 40 in question, for locking of the coupling head in the coupling frame.

The coupling frame 53 is displaceable between an outer position in the pull-in funnel 50, in which position the locking of the coupling head 7 takes place, and an inner position in which the connection between the valve flanges 32 and the transfer pipes 56 on the shuttle tanker 2 takes place. The coupling frame is suspended from four hydraulic cylinders 57, one at each corner of the frame, which provide for said displacement of the frame. This arrangement implies that the last part of the pull-in of the coupling head will take place under safe control, and furthermore the coupling head will hang stably at rest during inspection and cleaning. The coupling frame runs in four angular guide rails 58 constituting a direct extension of the pull-in funnel 50. The rail arrangement is necessary because of the inclined position of the funnel and the frame relative to the deck of the ship.

The aforementioned primary couplers for interconnection of the coupling flanges 32 of the coupling head with the transfer pipes 56 are shown at 59 and comprises hydraulically operated locking dogs 60 griping at the rare of the flanges 32. As mentioned above, the couplers are of the failsafe type, so that they will remain in the locked position even if the hydraulic pressure should be lost.

As also mentioned above, the pull-in funnel 50 is mounted in an inclined position on the deck of the vessel 2, and so that the introduction opening of the funnel lies at a level with the deck. As suggested in FIG. 1, the upper part of the funnel is built into a deck house 65. This consists of a frame structure keeping the pull-in funnel in place, and the house will also have walls and a roof, so that the couplers, connecting flanges etc. are hidden for wind and weather. A part of the house suitably may have sliding walls and a sliding roof (not shown) for easier maintenance and inspection.

A pair of winches 66 for the pull-in wires 42 are shown to be arranged on the roof of the deck house. The winches possibly may be placed at deck level, with pulleys for the wires at the top of the deck house. The winches preferably are of the constant tension type.

Before the interconnection of the connecting flanges 32 with the adjacent bends of the transfer pipes 56 can be effected, the flanges must be inspected, cleaned (suitably with alcohol) and dried in order to remove all rests of water. To this end there is arranged a flashing and drying arrangement suggested at 67 in FIG. 1. This arrangement comprises nozzles for spraying of the flanges with alcohol, and dryer fans placed at the roof of deck house. During pull-in of the coupling head, the flanges will be protected by covers to avoid that water penetrates into pipes and valves. It should here also be remarked that the top of the pull-in funnel is open, with a view to inspection and cleaning of the flanges.

A second embodiment of the system according to the invention is shown in FIGS. 14–22 and will be briefly described below.

In these figures there are used reference numerals designating the following elements:

70: Pull-in head
71: Brackets for guide posts
72: Double ball valves
73: Connecting flange
74: Upper framework
75: Guide posts
76: Hydraulic primary coupling
77: Locking lugs
78: Coupling frame
79: Guide funnel
80: Pull-in funnel
81: Guide slot
82: Hydraulic cylinder
83: Guide rail
84: Relief wire This embodiment of the system is different from the first embodiment in that all of the flexible couplings 33 and the rotary swivels 34 on the coupling head 7 in the first embodiment are removed, and the emergency disconnection system has been moved over to the shuttle tanker 2. These changes have been effected in order to reduce the weight and remove all possible leakage points or weak links on the coupling or pull-in bead. Further, the shuttle tanker normally will be equipped with a dynamic positioning system, so that the vertical movements are limited and thereby eliminate or delimit the demand to swivels and flexible joints on the pull-in head.

As appears from the drawing figures, the number of flexible pipes or hoses has been increased to six, but the diameter thereof is reduced to 12".

As regards the equipment on the production ship 1, it is only the pull-in head which is changed in relation to the first embodiment of the system.

The pull-in head 70 consists of only one frame part, three branch pipes with connecting flanges 73, two guide posts 75 and four locking lugs 77. The pull-in head 70 will be pulled into the pull-in funnel 80 and connected as previously (see FIGS. 18–20).

As regards the equipment on the shuttle tanker 2, it is essentially couplers, emergency disconnection system and parts of the coupling frame which have been changed.

The locking arrangement between the pull-in head 70 and the coupling frame 78 has been moved from the guide funnels 79 to the framework proper. Four hydraulic locking cylinders 82 are located on the coupling frame, and four corresponding lugs 79 are located on the upper part of the pull-in head.

Three tension relief wires 84 are suspended from the lower part of the frame. These wires run in parallel with the flexible pipes and are suspended from the top of the A-frame.

The emergency disconnection system 72 is part of the permanent piping on the shuttle tanker, so that the couplers 76 are located at the lower end of the emergency disconnection system (see FIG. 17). In case of a possible emergency disconnection, the couplers 76 and the lower part of the emergency couplings 72 will follow the pull-in head 70, as shown in FIG. 22. Coupling or connection after such an emergency disconnection will take place as previously.

Emergency disconnection in most cases will take place in a controlled manner in order to avoid that vital members be dropped in the sea (great damage may arise on the equipment). With a controlled emergency disconnection is meant that the pull-in head and the lower part of the emergency disconnector are pulled over to the production ship, such as in a traditional disconnection. In some emergency cases it may still be necessary to cut the wires and drop the pull-in head into the sea.

In the following, for the sake of completeness, there will be given a further description of different procedures in operation of the system according to the first embodiment of the invention, more specifically in connection with "pull-in and connection", "disconnection and withdrawal", "emergency disconnection" and "interconnection after emergency disconnection".

Pull-in and Connection
1. Transfer the mooring hawsers 3 from the production ship (PS) to the shuttle tanker (ST)
2. Transfer forerunners/pull-in wires from PS to ST, forerunners/wires running through the guide post 40 of the coupling head 7
3. Fasten forerunners/wires on the pull-in winches 66
4. Inspect the coupling head and check that protection is mounted on the flanges 32
5. Secure the wires in the guide posts 40. The wires are now "divided" into a pull-in wire part 42 and a tension wire part 22
6. Tighten tension wires by means of the winches 21 on PS so that the coupling head 7 is lifted free from the locks on the platform 19
7. Start the pull-in winches 66 at the same time as the tension winches 21 are placed in constant tension mode and the A-frame 6 is pivoted astern
8. Transfer the coupling head from PS to ST, tensioning and pulling forces together with the A-frame being adjusted so that the coupling head 7 and the flexible pipe means 4 are always well clear of the surface of the sea
9. Adjust tensioning and pulling forces so that the coupling head 7 gets the correct position in relation to the pull-in funnel 50 when the coupling head is approaching the funnel
10. Pull the head fully into the funnel 50 and lock it fixedly to the coupling frame 53, stop the pull-in winches 66, but run out an extra length of wire on the tension winches 21
11. Remove the protective covers over the flanges 32 and inspect these, flush with alcohol and run the dryer fans
12. Run the hydraulic cylinders 57 on the coupling frame 53 to lift the flanges 32 up to the hydraulic couplers 59
13. Operate the couplers 59 and connect the flanges 32 to the pipes 56
14. Open the transverse connection valves on ST and cool the two transfer pipes with nitrogen
15. Open the remaining valves on PS and ST and start transfer of LNG Disconnection and Withdrawal
1. Close necessary valves on ST and PS
2. Open transverse connection valves and blow the delivery pipes empty of LNG
3. Open the hydraulic couplers 59
4. Lower the coupling frame 53 to the top of the pull-in funnel 50
5. Place protective covers over the flanges 32 on the coupling head 7
6. Open the hydraulic locking means between the coupling frme 53 and the coupling head
7. Start the pull-in winches 21 on PS and the tensioning or tightening winches 66 on ST. (The winches now have changed function from tension to pull-in and vice versa)
8. Lower the coupling head 7 slowly downwards in the pull-in funnel 50, run the winches 21 and 66 and the A-frame 6
9. When the coupling head is situated outside of the funnel, it is pulled over towards PS, the winches and the A-frame being run so that the coupling head and the flexible pipes are maintained well clear of the surface of the sea
10. The coupling head is pulled onto the platform 19 and locked, and the wires and the flexible pipes are relieved in that the coupling head rests on the locking arrangement on the platform Emergency Disconnection and Interconnection
If it should become necessary with an emergency disconnection, this is controlled from the shuttle tanker as this vessel has to change position in a possible case of emergency.

The Following Procedure is Carried out:
1. Close all valves on ST and PS and stop transfer of LNG
2. Cut the pull-in wires 42 by means of the cutter means 52, so that the wires will automatically slide into the sea
3. Activate the emergency disconnection on the coupling head 7. Because of icing it will probably take some time before the couplers loosen. The lower framework 39 of the coupling head and the components fastened thereto (see FIG. 13) will slide into the sea
4. The emergency-disconnected parts are pulled on board the production ship, and necessary checks and possible repairs are carried out Interconnection After Emergency Disconnection
1. Lower the coupling frame 53 to the lower or outer position in the connection unit 8
2. Transfer the pull-in wires from PS to ST, the wires then having to be threaded through the miniposts 45 on the lower framework 39
3. Pull in sufficient wire length on the pull-in winches 66, i.e. about the double length of the distance between PS and ST. (Since the wires in a possible emergency disconnection will be cut on the shuttle tanker, it is important that so much wire is pulled in that this may later be transferred to the production ship and again pull in the emergency-disconnected part of the coupling head).

4. Fasten the pull-in wires by means of a wire lock at the rear of the minipost 45
5. Follow the procedure for usual pull-in from step 6
6. Pull the lower framework 39 with the emergency disconnection system up into the pull-in funnel 50, maintain tension on the pull-in wires 42 and interconnect the separated units.
7. Remove the wire lock at the rear of the miniposts
8. Continue LNG transfer or effect disconnection

What is claimed is:

1. A system for offshore cryogenic loading, especially for transfer of liquefied natural gas (LNG) between two vessels (1, 2), comprising a coupling head (7; 70) mounted at one end of a flexible pipe means (4) of which the other end is connected to a carrying means (6) on a first vessel (1) and is arranged to be pulled over to the second vessel (2) by a wire means (22), and a connection unit (8) mounted on the second vessel (2) and comprising a means (50; 80) for guided pull-in of the coupling head (7; 70) to a position in which the pipe means (4) can be connected to transfer pipes (56) on the second vessel (2), characterised in that the connection unit (8) comprises a pull-in funnel (50; 80) arranged for receiving and guiding of the coupling head (7; 70) to a locking position in cooperation with a guide means (40, 41; 75, 71) on the coupling head (7; 70), the coupling head (7; 70) being connected to at least one pull-in wire (42) for pulling-in of the coupling head (7; 70) into the connection unit (8) by a winch means (66) on the second vessel (2), and the flexible pipe means (4) and the transfer pipes (56) on the second vessel (2) in a connecting position of the coupling head (7; 70) being interconnected via respective valve means (31; 72) arranged in the coupling head (7; 70) or in the connection unit (8).

2. A system according to claim 1, characterised in that the pull-in funnel (50; 80) comprises an outwardly divergent, outer portion passing smoothly into a cylindrical, inner portion for receipt of the coupling head (7; 70), and that the funnel along opposite sides is provided with a pair of longitudinally extending guide slots (51; 81) having a relatively large width at the lead-in opening of the funnel (50; 80) and being inwardly converging towards parallel guide slots in the cylindrical portion of the funnel, the guide slots (51; 81) being arranged to receive corresponding parts (41; 71) of the guide means (40, 41; 75, 71) of the coupling head (7; 70).

3. A system according to claim 1, characterised in that the connection unit (8) comprises a coupling frame (53; 78) which is displaceably mounted in the pull-in funnel (50; 80) between an outer position defining the locking position of the coupling head (7; 70), and an inner position defining the connecting position of the coupling head.

4. A system according to claim 3, characterised in that the coupling frame (53; 78) is coupled to a number of hydraulic cylinders (57; 82), for movement of the frame (53; 78) between the outer and the inner position.

5. A system according to claim 1, characterised in that the coupling head (7) consists of a bipartite frame (30) comprising a first (38) and a second (39) frame member which are disconnectable from each other, the valve means (31) being mounted in the frame (30) and each valve means (31) being bipartite to allow an emergency disconnection of the pipe means (4), the respective valve members (35, 36) of each valve means (31) being interconnected by means of a hydraulically driven locking and release mechanism (37).

6. A system according to claim 5, characterised in that the pipe means (4) consists of a number of parallelly extending flexible pipes (5) which are coupled to the respective valve means (31) via a flexible joint (33) and a swivel (34).

7. A system according to claim 6, characterised in that the valve means (31) are provided with connecting flanges (32) projecting somewhat above the bipartite frame (30) and being adapted for connection to the transfer pipes (56) on the second vessel (2) by means of hydraulically operated main couplers (59) in the connection unit (8).

8. A system according to claim 1, characterised in that the coupling head (70) consists of a frame member in which there are mounted a number of branch pipes provided with flanges for connection partly to the pipe means (4) and partly to hydraulically operated coupling units (76) mounted in the connection unit (8), said valve means (72) being mounted in the connection unit (8) and, in the connecting position of the coupling head (70), forming connections between the branch pipes and the transfer pipes (56) on the second vessel (2).

9. A system according to claim 8, characterised in that each of the valve means (72) is bipartite in order to allow an emergency disconnection of the pipe means (4).

10. A system according to claim 2, characterised in that the guide means of the coupling head (7; 70) comprises a pair of guide posts (40; 75) arranged on opposite sides of the coupling head and being fastened to outwards projecting holding members (41; 71) adapted for guiding in the longitudinal guide slots (51; 81) of the pull-in funnel (50; 80), the guide posts (40; 75) being adapted for introduction into respective guide funnels (54; 79) in the connection unit (8).

11. A system according to claim 10, characterised in that the guide posts (40; 75) are hollow, with a through passage for a respective pull-in wire (42), and are provided with means for locking of the wire (42) in relation to the guide posts (40; 75).

12. A system according to claim 11, characterised in that each of the guide posts (40) is provided with a groove (44) for engagement with a locking member of a hydraulically operated locking means (55), for locking of the coupling head (7) to the coupling frame (53) of the connection unit (8).

13. A system according to claim 12, characterised in that each of the guide posts (40) is provided with a slot (43) for introduction of an appurtenant cutter in a cutter means (52) for cutting of the wire (42) in question, in case of in an emergency disconnection.

14. A system according to claim 1, characterised in that the pull-in funnel (50) is mounted in an inclined position in which its lower lead-in opening is on a level with the deck of the second vessel (2), and that the upper part of the funnel (50) is built into a closable house (65) on the deck of the vessel (2).

15. A system according to claim 1, characterised in that the flexible pipe means (4) at the end opposite to the coupling head (7; 70) is connected to the upper end of a boom means (6) constituting said carrying means, the boom means (6) being pivotable in a vertical plane between a first end position in which the boom means (6) projects inwards over the first vessel (1) and the pipe means (4) is supported by a supporting means (17) on the vessel (1), and a second end position in which the boom means (6) projects outwards from the first vessel (1) and the coupling head (7; 70) with the pipe means (4) is pulled away from the vessel and is introduced into the connection unit (8) on the second vessel (2).

16. A system according to claim 15, characterised in that the boom means (6) consists of an A-frame which, at its lower end, is pivotally mounted on the first vessel (1), the pipes of the flexible pipe means (4) being coupled to pipe stretches (14) supported by respective legs (15) of the A-frame (6).

17. A system according to claim 16, characterised in that the supporting means (17) is a ramp mounted in the opening between the legs (15) of the A-frame (6), and having an arcuate convex surface supporting a major part of the pipe means (4) in the first end position of the A-frame (6).

18. A system according to claim 1, characterised in that the at least one pull-in wire (42) of the coupling head (7) at the end which is remote from the coupling head is connected to respective winch means (21) on the first vessel (1).

* * * * *